(12) United States Patent
Izumi

(10) Patent No.: US 9,674,617 B2
(45) Date of Patent: Jun. 6, 2017

(54) ELECTRONIC APPARATUS COMPRISING A PIEZOELECTRIC VIBRATION MODULE CONFIGURED TO VIBRATE A COVER PANEL, STORAGE MEDIUM STORING CONTROL PROGRAM THAT CONTROLS THE ELECTRONIC APPARATUS AND INFORMATION NOTIFICATION METHOD OF THE ELECTRONIC APPARATUS

(71) Applicant: KYOCERA Corporation, Kyoto-shi, Kyoto (JP)

(72) Inventor: Takashi Izumi, Nara (JP)

(73) Assignee: KYOCERA Corporation, Kyoto (JP)

( * ) Notice: Subject to any disclaimer, the term of this patent is extended or adjusted under 35 U.S.C. 154(b) by 207 days.

(21) Appl. No.: 14/580,163

(22) Filed: Dec. 22, 2014

(65) Prior Publication Data
US 2015/0104047 A1 Apr. 16, 2015

Related U.S. Application Data

(63) Continuation of application No. PCT/JP2013/067101, filed on Jun. 21, 2013.

(30) Foreign Application Priority Data

Jun. 22, 2012 (JP) ................. 2012-140868

(51) Int. Cl.
*H04R 29/00* (2006.01)
*H04R 17/00* (2006.01)
(Continued)

(52) U.S. Cl.
CPC ............. *H04R 17/00* (2013.01); *H04M 1/03* (2013.01); *H04R 1/02* (2013.01); *H04R 3/00* (2013.01); *H04R 29/00* (2013.01)

(58) Field of Classification Search
CPC .......... H04R 17/00; H04R 3/00; H04R 29/00; H04M 1/03
(Continued)

(56) References Cited

U.S. PATENT DOCUMENTS 8,170,628 B2    5/2012  Wakizaka et al.
2006/0099996 A1  5/2006  Kanai

FOREIGN PATENT DOCUMENTS

JP    2006-135858 A    5/2006
JP    2007-189578 A    7/2007
(Continued)

OTHER PUBLICATIONS

International Search Report dated Sep. 17, 2013 issued in corresponding International Application No. PCT/JP2013/067101.
(Continued)

*Primary Examiner* — Paul S Kim
*Assistant Examiner* — Katherine Faley
(74) *Attorney, Agent, or Firm* — Procopio Cory Hargreaves and Savitch LLP

(57) ABSTRACT

When a driving module is performing processing of vibrating a piezoelectric vibration module based on a sound signal in an electronic apparatus, a determination module determines whether or not an ear putting position specified by an ear putting position specifying module is close to a reference position. When the processing is being performed, a notification module notifies the user at least one of that the ear putting position is appropriate and that the ear putting position is inappropriate, based on a determination result of the determination module.

12 Claims, 13 Drawing Sheets

(51) Int. Cl.
    *H04M 1/03*     (2006.01)
    *H04R 1/02*     (2006.01)
    *H04R 3/00*     (2006.01)
(58) Field of Classification Search
    USPC .................................................. 381/58, 162
    See application file for complete search history.

(56) References Cited

FOREIGN PATENT DOCUMENTS

| | | | |
|---|---|---|---|
| JP | 2010-087889 A | 4/2010 | |
| JP | 2010-154407 A | 7/2010 | |
| JP | 2011-205256 A | 10/2011 | |
| JP | WO 2011121740 A1 * | 10/2011 | .............. H04M 1/02 |
| JP | 2012-034263 A | 2/2012 | |

OTHER PUBLICATIONS

Written Opinion of the International Search Authority dated Sep. 17, 2014 issued in corresponding International Application No. PCT/JP2013/067101.

Office Action Dated Sep. 24, 2014 issued for corresponding Japanese application No. 2012-140868.

* cited by examiner

F I G . 3
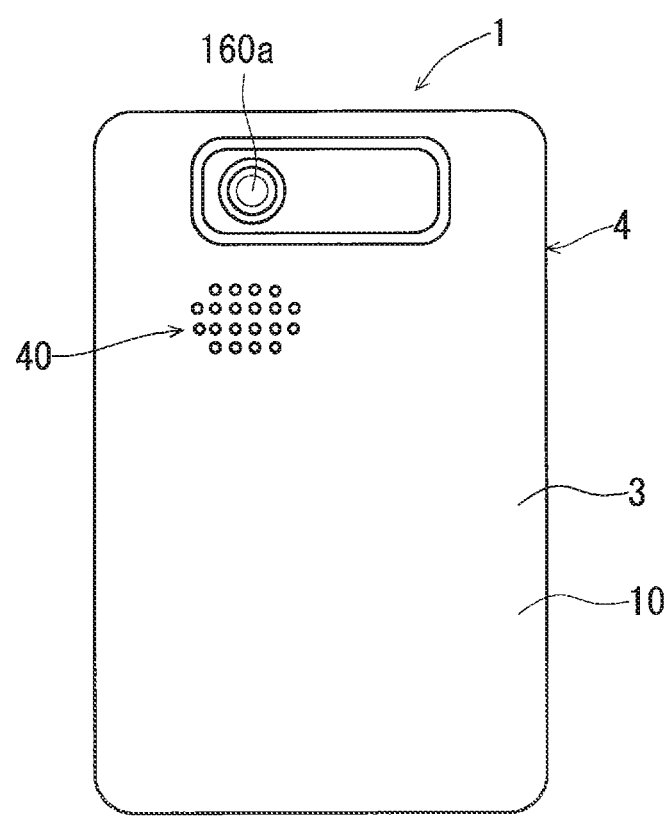

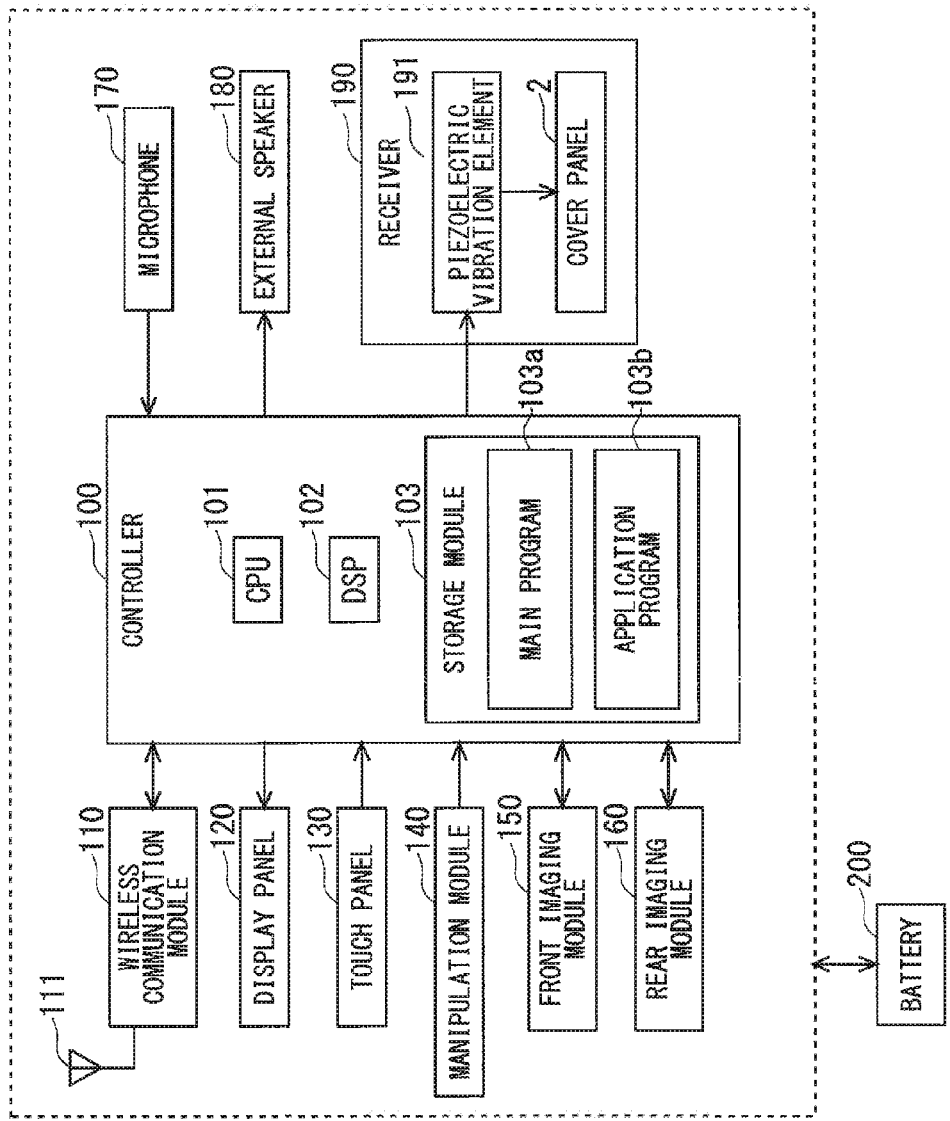
F I G. 4

F I G . 5
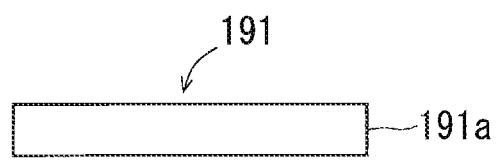
F I G . 6
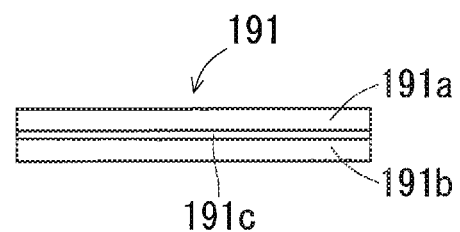

F I G . 1 4
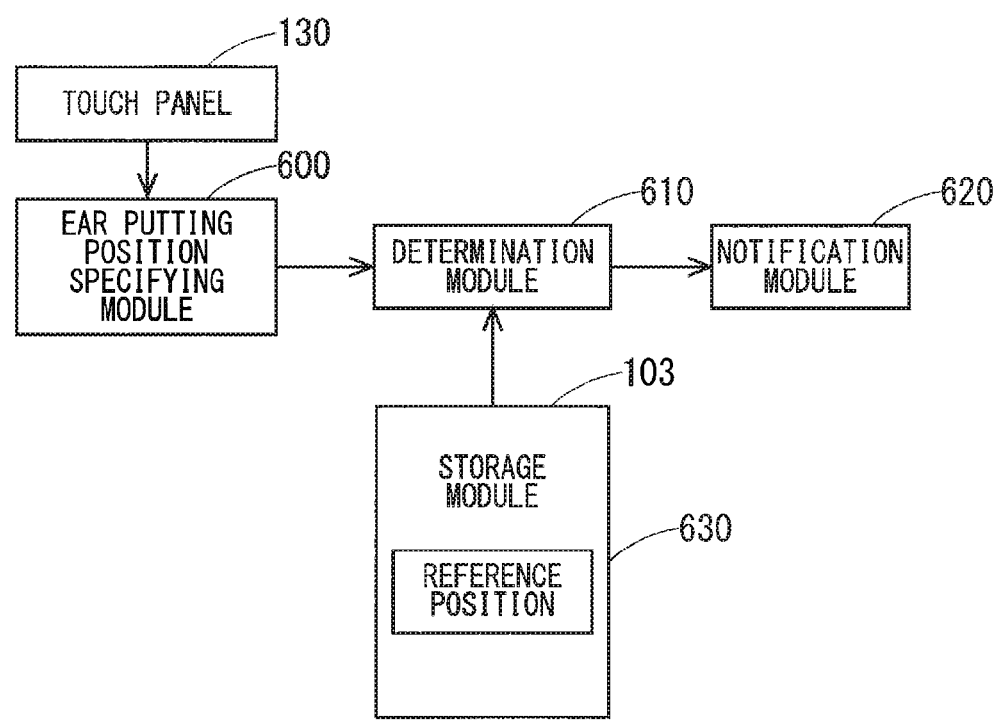

F I G . 1 6
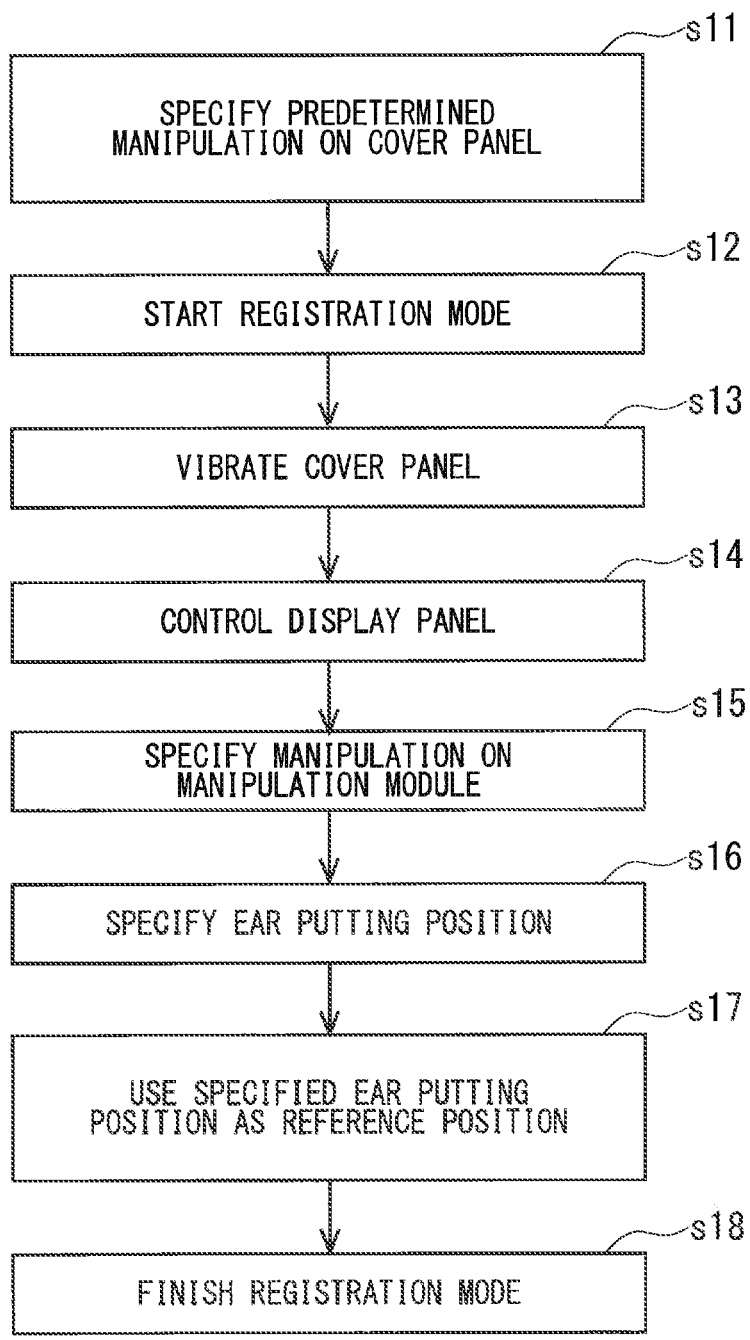

F I G . 1 7
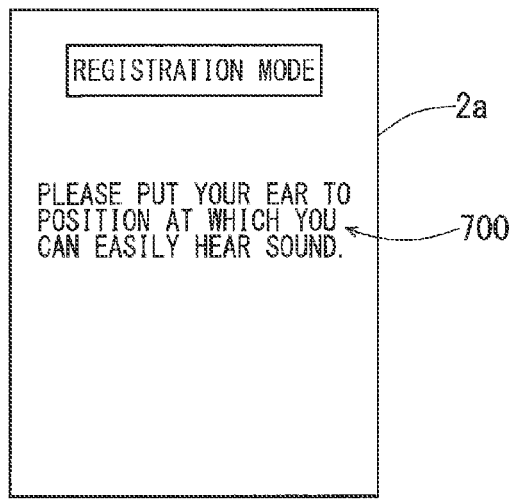
F I G . 1 8
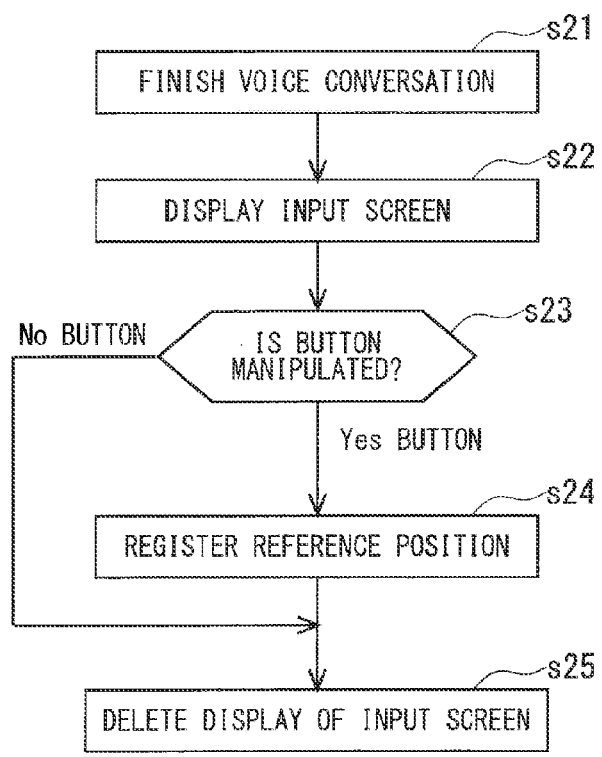

US 9,674,617 B2

ELECTRONIC APPARATUS COMPRISING A PIEZOELECTRIC VIBRATION MODULE CONFIGURED TO VIBRATE A COVER PANEL, STORAGE MEDIUM STORING CONTROL PROGRAM THAT CONTROLS THE ELECTRONIC APPARATUS AND INFORMATION NOTIFICATION METHOD OF THE ELECTRONIC APPARATUS

The present application is based on PCT Application No. PCT/JP2013/067101, filed on Jun. 21, 2013, which claims the benefit of Japanese Application No. 2012-140868, filed on Jun. 22, 2012. PCT Application No. PCT/JP2013/067101 and Japanese Application No. 2012-140868 are entitled "ELECTRONIC APPARATUS, CONTROL PROGRAM AND INFORMATION NOTIFICATION METHOD". The contents of which are incorporated by reference herein in their entirety.

TECHNICAL FIELD

Embodiments of the present disclosure relate to an electronic apparatus.

BACKGROUND ART

Various technologies have been conventionally proposed for electronic apparatuses.

SUMMARY

An electronic apparatus, storage medium and method are disclosed. In one embodiment, a cover panel is provided in a surface of the electronic apparatus. A piezoelectric vibration module is configured to vibrate the cover panel. A driving module is configured to vibrate the piezoelectric vibration module based on a sound signal. A detector is configured to detect a touch on the cover panel. An ear putting position specifying module is configured to, when the driving module is performing processing of vibrating the piezoelectric vibration element based on the sound signal in the electronic apparatus, specify an ear putting position of a user with respect to the cover panel based on a detection result of the detector. A determination module is configured to, when the processing is being performed, determine whether or not the ear putting position is close to a reference position. A notification module is configured to, when the processing is being performed, notify the user at least one of that the ear putting position is appropriate and that the ear putting position is inappropriate, based on a determination result of the determination module.

In one embodiment, a storage medium is a non-temporary storage medium readable by a computer. The storage medium stores control program that controls an electronic apparatus that includes a cover panel that is provided in a surface and a piezoelectric vibration module whose vibration vibrates the cover panel. The control program is configured to cause the electronic apparatus to execute steps (a) to (e). The step (a) is performing processing of vibrating the piezoelectric vibration element based on a sound signal. The step (b) is detecting a touch on the cover panel. The step (c) is specifying, when the processing is being performed, an ear putting position of a user with respect to the cover panel based on a detection result in the step (b). The step (d) is determining, when the processing is being performed, whether or not the ear putting position specified in the step (c) is close to a reference position. The step (e) is notifying, when the processing is being performed, to the user at least one of that the ear putting position is appropriate and that the ear putting position is inappropriate, based on a determination result in the step (d).

In one embodiment, an information notification method is an information notification method of an electronic apparatus that includes a cover panel that is provided in a surface and a piezoelectric vibration module whose vibration vibrates the cover panel. The method includes the steps (a) to (e). The step (a) is performing processing of vibrating the piezoelectric vibration element based on a sound signal. The step (b) is detecting a touch on the cover panel. The step (c) is specifying, when the processing is being performed, an ear putting position of a user with respect to the cover panel based on a detection result in the step (b). The step (d) is determining, when the processing is being performed, whether or not the ear putting position specified in the step (c) is close to a reference position. The step (e) is notifying, when the processing is being performed, to the user at least one of that the ear putting position is appropriate and that the ear putting position is inappropriate, based on a determination result in the step (d).

BRIEF DESCRIPTION OF DRAWINGS

FIG. 3 illustrates a rear view showing the external appearance of the electronic apparatus.

FIG. 4 illustrates a block diagram mainly showing an electrical configuration of the electronic apparatus.

FIG. 5 illustrates a top view showing a structure of a piezoelectric vibration element.

FIG. 6 illustrates a side view showing the structure of the piezoelectric vibration element.

FIG. 14 illustrates a block diagram showing a configuration of part of the electronic apparatus.

FIG. 16 illustrates a flowchart showing an operation of the electronic apparatus.

FIG. 17 illustrates a view showing a display example of the electronic apparatus.

FIG. 18 illustrates a flowchart showing an operation of the electronic apparatus.

DESCRIPTION OF EMBODIMENT

<External Appearance of Electronic Apparatus>

Figure 1:
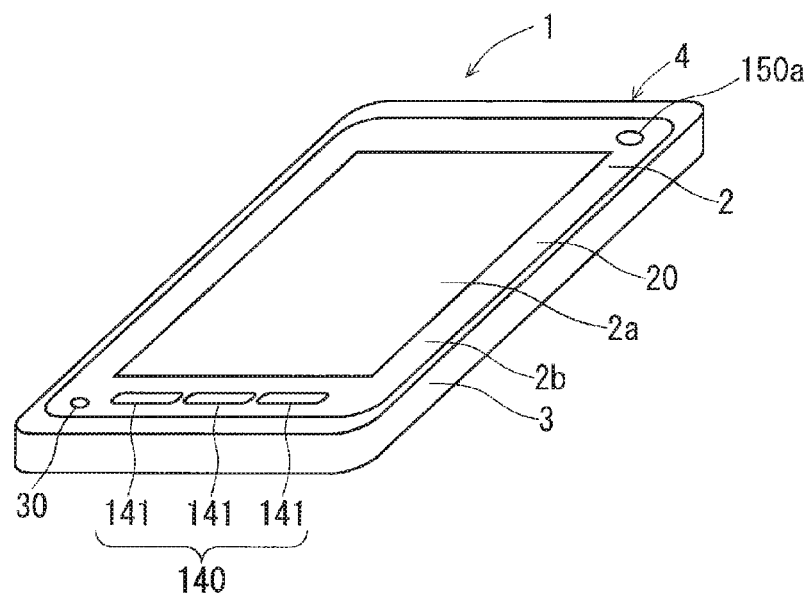
FIG. 1 illustrates a perspective view showing an external appearance of an electronic apparatus.
Figure 2:
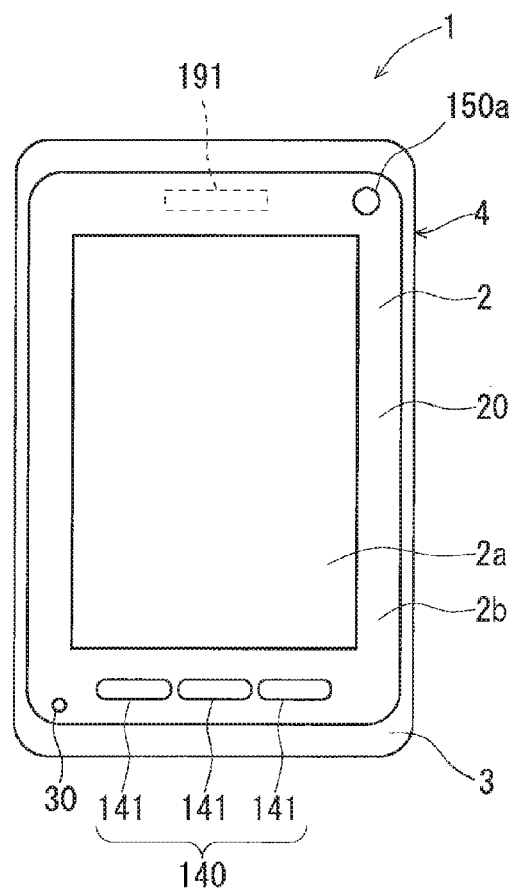
FIG. 2 illustrates a front view showing the external appearance of the electronic apparatus.

FIGS. 1 to 3 are a perspective view, a front view and a rear view showing an external appearance of an electronic apparatus 1 according to an embodiment, respectively. The electronic apparatus 1 according to the present embodiment is, for example, a mobile phone. As shown in FIGS. 1 to 3, the electronic apparatus 1 includes a cover panel 2 and a case part 3. The cover panel 2 and the case part 3 are combined to constitute an apparatus case 4 having a substantially rectangular, plate shape in a plan view.

The cover panel 2 has a substantially rectangular shape in a plan view. The cover panel 2 forms a part in a front part of the electronic apparatus 1 other than a peripheral part thereof. The cover panel 2 is formed of, for example, a transparent glass or a transparent acrylic resin. The case part 3 forms the peripheral part of the front part, a lateral part, and a rear part of the electronic apparatus 1. The case part 3 is formed of, for example, a polycarbonate resin.

The cover panel 2 is provided with a display part 2a on which various types of information such as characters, symbols, and diagrams are displayed. The display part 2a has, for example, a rectangular shape in a plan view. A peripheral part 2b which surrounds the display part 2a in the cover panel 2 is black through, for example, application of a film. The peripheral part 2b accordingly serves as a non-display part on which no information is displayed. Attached to an inner main surface of the cover panel 2 is a touch panel 130, which will be described below. This allows a user to provide various instructions to the electronic apparatus 1 by manipulating the display part 2a of the cover panel 2 with the finger or the like.

Provided inside the apparatus case 4 is a manipulation module 140 including a plurality of manipulation buttons 141. Each manipulation button 141 is a so-called "hard key", and the surface thereof is exposed from a lower-side end portion of an outer main surface 20 of the cover panel 2. Additionally, a microphone hole 30 is made in the lower-side end portion of the cover panel 2. From an upper-side end portion of the outer main surface 20 of the cover panel 2, an imaging lens 150a of a front imaging module 150, which will be described below, can be visually recognized. Although three manipulation buttons 141 being "hard keys" are provided in the electronic apparatus 1 according to the present embodiment, the number of the manipulation buttons 141 may be appropriately changed. Alternatively, no manipulation buttons 141 may be provided.

As shown in FIG. 2, provided inside the apparatus case 4 is a piezoelectric vibration element 191 described below. Additionally, as shown in FIG. 3, speaker holes 40 are made in a rear surface 10 of the electronic apparatus 1, namely, in a rear surface of the apparatus case 4. From the rear surface 10 of the electronic apparatus 1, an imaging lens 160a of a rear imaging module 160, which will be described below can be visually recognized.

<Electrical Configuration of Electronic Apparatus>

FIG. 4 is a block diagram mainly showing an electrical configuration of the electronic apparatus 1. As shown in FIG. 4, the electronic apparatus 1 includes a controller 100, a wireless communication module 110 including an antenna 111, a display panel 120, the touch panel 130, the manipulation module 140, the front imaging module 150 and the rear imaging module 160. The electronic apparatus 1 further includes a microphone 170, an external speaker 180, and a receiver 190 configured with the piezoelectric vibration element 191 and the cover panel 2, and a battery 200. These components of the electronic apparatus 1 except for the cover panel 2 are housed in the apparatus case 4.

The controller 100 controls other components of the electronic apparatus 1 to collectively manage the operation of the electronic apparatus 1. The controller 100 mainly includes a CPU (Central Processing Unit) 101, a DSP (Digital Signal Processor) 102, and a storage module 103.

The storage module 103 is configured with a non-transitory recording medium which can be read by the controller 100 (the CPU 101 and the DSP 102) such as a ROM (read only memory) and a RAM (random access memory). As shown in FIG. 4, the storage module 103 stores a main program 103a being a control program for controlling the electronic apparatus 1, more specifically, the components such as the wireless communication module 110 and the display panel 120 included in the electronic apparatus 1, a plurality of application programs 103b, and the like. The various functions of the controller 100 can be implemented by the CPU 101 and the DSP 102 executing the various programs in the storage module 103.

In addition, the storage module 103 may include a computer-readable, non-transitory recording medium, except for the ROM and RAM. The storage module 103 may include, for example, a small hard disk drive, a small SSD (solid state drive), and the like.

The wireless communication module 110 receives, through the antenna 111, a signal from a mobile phone different from the electronic apparatus 1 or a communication device such as a web server connected to the Internet via a base station. The wireless communication module 110 performs amplification processing and down-conversion on the received signal and then outputs a resultant signal to the controller 100. The controller 100 performs demodulation processing or the like on a received signal to be input, to thereby obtain a sound signal indicative of voice or music contained in the received signal. Also, the wireless communication module 110 performs up-conversion and amplification processing on a transmission signal including the sound signal or the like generated by the controller 100, to thereby wirelessly transmit the processed transmission signal from the antenna 111. The transmission signal from the antenna 111 is received by a mobile phone different from the electronic apparatus 1 or a communication device connected to the Internet via the base station.

The display panel 120 is, for example, a liquid crystal display panel or an organic EL panel. The display panel 120 displays various types of information such as characters, symbols, and graphics under control of the controller 100. The information, which is to be displayed on the display panel 120, is displayed in the display part 2a of the cover panel 2 to be visible to the user of the electronic apparatus 1.

The touch panel 130 is, for example, a projected capacitance touch panel. The touch panel 130 detects a contact of an object with the display part 2a of the cover panel 2. The touch panel 130 is bonded to the inner main surface of the cover panel 2 and includes two sheet-like electrode sensors disposed to face each other. The two electrode sensors are bonded together with a transparent adhesive sheet.

Formed in one of the electrode sensors are a plurality of elongated X electrodes which extend in the X-axis direction (for example, the horizontal direction of the electronic apparatus 1) and are disposed parallel to each other. Formed in the other electrode sensor are a plurality of elongated Y electrodes which extend in the Y-axis direction (for example, the vertical direction of the electronic apparatus 1) and are disposed parallel to each other. When the user's finger touches the display part 2a of the cover panel 2, a capacitance between the X electrode and the Y electrode located below the touched portion changes. Consequently, the touch panel 130 detects the manipulation on (contact with) the display part 2a of the cover panel 2. A change in the capacitance between the X electrode and the Y electrode, which occurs in the touch panel 130, is transmitted to the controller 100. The controller 100 identifies, based on the capacitance change, the details of the manipulation made on the display part 2a of the cover panel 2, and performs the corresponding operation.

Hereinafter, an intersection between one X electrode and one Y electrode in a plan view of the touch panel 130 will be referred to as a "XY intersection". Hence, the touch panel 130 includes a plurality of XY intersections arranged in a matrix state. When the user's finger touches the display part 2a of the cover panel 2, a capacitance change at least one XY intersection located below the touched portion is transmitted to the controller 100.

For each of the plurality of manipulation buttons 141, when the user presses a manipulation button 141, the manipulation module 140 outputs to the controller 100 a manipulation signal indicating that the manipulation button 141 has been pressed. The controller 100 identifies, based on the input manipulation signal, which manipulation button 141 of the plurality of manipulation buttons 141 has been manipulated and then performs the operation corresponding to the manipulation button 141 which has been manipulated.

The front imaging module 150 is configured with the imaging lens 150a, an imaging element, and the like. The front imaging module 150 takes a still image and a moving image under the control of the controller 100. As shown in FIGS. 1 and 2, the imaging lens 150a is provided in the front surface of the electronic apparatus 1. The front imaging module 150 can thus take an image of the object located on the front side (cover panel 2 side) of the electronic apparatus 1.

The rear imaging module 160 is configured with the imaging lens 160a, an imaging element, and the like. The rear imaging module 160 takes a still image and a moving image under the control of the controller 100. As shown in FIG. 3, the imaging lens 160a is provided in the rear surface 10 of the electronic apparatus 1. The rear imaging module 160 thus can take an image of the object located on the rear surface 10 side of the electronic apparatus 1.

The microphone 170 converts the sound input from the outside of the electronic apparatus 1 into an electrical sound signal and then outputs the electrical sound signal to the controller 100. The sound from the outside of the electronic apparatus 1 is taken inside the electronic apparatus 1 through the microphone hole 30 provided in the front surface of the cover panel 2 to be input to the microphone 170. In addition, the microphone hole 30 may be provided in the lateral surface of the electronic apparatus 1 or may be provided in the rear surface 10.

The external speaker 180 is, for example, a dynamic speaker (electromagnetic speaker). The external speaker 180 converts an electrical sound signal from the controller 100 into sound and then outputs the sound. The sound output from the external speaker 180 is output to the outside through the speaker holes 40 provided in the rear surface 10 of the electronic apparatus 1. The sound output through the speaker holes 40 can be heard at a place remote from the electronic apparatus 1.

The receiver 190 transmits received sound to the user, and is configured with the piezoelectric vibration element 191 and the cover panel 2. The receiver 190 outputs sound with a volume smaller than that of the external speaker 180. More specifically, the receiver 190 outputs the sound large enough for the user to hear when the user puts the ear near or into contact with the cover panel 2. The piezoelectric vibration element 191 is provided on the inner main surface of the cover panel 2, and is vibrated by a drive voltage applied from the controller 100. The controller 100 generates a drive voltage based on a sound signal, and then applies the drive voltage to the piezoelectric vibration element 191. That is, the controller 100 functions as a driving module which vibrates the piezoelectric vibration element 191 based on a sound signal. The piezoelectric vibration element 191 is vibrated based on a sound signal by the controller 100, so that the cover panel 2 vibrates based on the sound signal, thereby transmitting the received sound to the user.

The battery 200 outputs the power supply for the electronic apparatus 1. The power supply output from the battery 200 is supplied to the electronic components included in the controller 100, the wireless communication module 110, and the like of the electronic apparatus 1.

The storage module 103 stores the various application programs 103b (hereinafter, merely referred to as "applications 103b"). The storage module 103 stores a voice communication application for voice communication, a videophone application for videophone communication, a browser for displaying a website, a mail application for creating, browsing, transmitting, and receiving an email, an application for displaying the still image data stored in the storage module 103, and a music playback application for playing back the music data stored in the storage module 103.

When the controller 100 executing the main program 103a in the storage module 103 reads and executes the application 103b in the storage module 103, the controller 100 controls the other components in the electronic apparatus 1, such as the wireless communication module 110, the display panel 120, and the receiver 190. As a result, the electronic apparatus 1 performs the function (processing) corresponding to this application 103b. For example, the controller 100 executing the voice communication application controls the wireless communication module 110, the microphone 170 and the piezoelectric vibration element 191 of the receiver 190. As a result, a sound included in a received signal received by the wireless communication module 110 is transmitted from the receiver 190 to the user, and a transmission signal including a sound input to the microphone 170 is transmitted from the wireless communication module 110, so that the electronic apparatus 1 performs voice communication with a communication partner device.

<Details of Piezoelectric Vibration Element>

FIGS. 5 and 6 are a top view and a side view showing the structure of the piezoelectric vibration element 191, respectively. As shown in FIGS. 5 and 6, the piezoelectric vibration element 191 has a long shape in one direction. More specifically, the piezoelectric vibration element 191 has an elongated rectangular plate shape in a plan view. The piezoelectric vibration element 191 has, for example, a bimorph structure. The piezoelectric vibration element 191 includes a first piezoelectric ceramic plate 191a and a second piezoelectric ceramic plate 191b bonded to each other with a shim material 191c therebetween.

In the piezoelectric vibration element 191, when a positive voltage is applied to the first piezoelectric ceramic plate 191a and a negative voltage is applied to the second piezoelectric ceramic plate 191b, the first piezoelectric ceramic plate 191a expands in the longitudinal direction and the second piezoelectric ceramic plate 191b contracts in the longitudinal direction. This causes, as shown in FIG. 7, the piezoelectric vibration element 191 to flex in a convex manner with the first piezoelectric ceramic plate 191a directed to the outer side.

In the piezoelectric vibration element 191, meanwhile, when a negative voltage is applied to the first piezoelectric ceramic plate 191a and a positive voltage is applied to the second piezoelectric ceramic plate 191b, the first piezoelectric ceramic plate 191a contracts in the longitudinal direction and the second piezoelectric ceramic plate 191b expands in the longitudinal direction. This causes, as shown in FIG. 8, the piezoelectric vibration element 191 to flex in a convex manner with the second piezoelectric ceramic plate 191b directed to the outer side.

Figure 7:
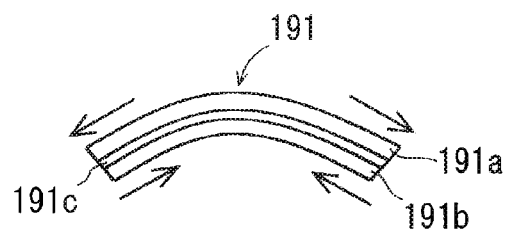
FIG. 7 illustrates a view showing a state in which the piezoelectric vibration element produces flexural vibrations.
Figure 8:
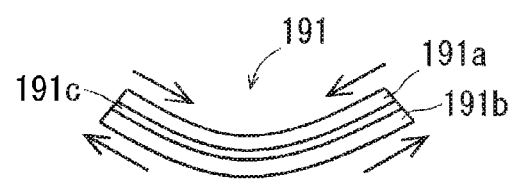
FIG. 8 illustrates a view showing the state in which the piezoelectric vibration element produces flexural vibrations.

The piezoelectric vibration element 191 alternately enters the state of FIG. 7 and the state of FIG. 8, to thereby produce flexural vibrations. The controller 100 causes an AC voltage, which alternates between positive and negative voltages, to be applied between the first piezoelectric ceramic plate 191a and the second piezoelectric ceramic plate 191b, causing the piezoelectric vibration element 191 to produce flexural vibrations.

In addition, while the piezoelectric vibration element 191 shown in FIGS. 5 to 8 is provided with a single structure configured with the first piezoelectric ceramic plate 191a and the second piezoelectric ceramic plate 191b which are bonded with the shim material 191c sandwiched therebetween, a plurality of the above-mentioned structures may be laminated.

<Position at which Piezoelectric Vibration Element is Disposed>

Figure 9:
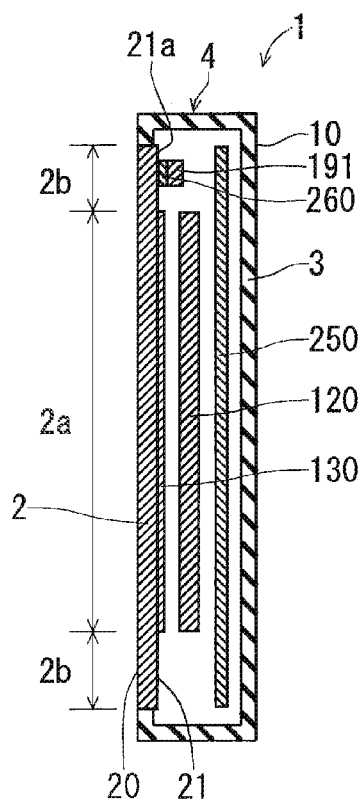
FIG. 9 illustrates a view showing a vertical cross-sectional structure of the electronic apparatus.

FIG. 9 is a view showing the cross-sectional structure in the vertical direction (longitudinal direction) of the electronic apparatus 1. Further, FIG. 10 is a plan view of the cover panel 2 when viewed from the inner main surface 21 side thereof.

Figure 10:
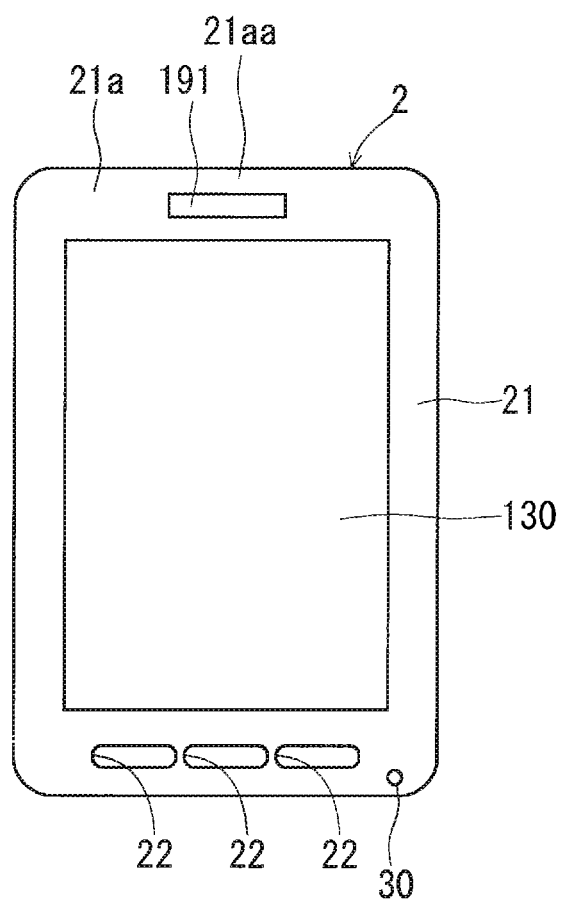
FIG. 10 illustrates a plan view showing a cover panel viewed from an inner main surface side.

As shown in FIGS. 9 and 10, the touch panel 130 is bonded to the inner main surface 21 of the cover panel 2 so as to face the display part 2a of the cover panel 2. Further, the display panel 120 being a display module is disposed to face the cover panel 2 and the touch panel 130. Hence, the touch panel 130 is thus located between the cover panel 2 and the display panel 120. The part of the cover panel 2, which faces the display panel 120, serves as the display part 2a.

Further, provided inside the apparatus case 4 is a printed circuit board 250 on which various components such as the CPU 101 and the DSP 102 are mounted. The printed circuit board 250 is disposed to face the display panel 120 between the display panel 120 and the rear surface 10 of the electronic apparatus 1. Further, as shown in FIG. 10, a plurality of holes 22 for respectively exposing the plurality of manipulation buttons 141 are made in the lower-side end portion of the cover panel 2.

The piezoelectric vibration element 191 is bonded to the inner main surface 21 of the cover panel 2 with an adhesive 260 such as a double-sided tape. The piezoelectric vibration element 191 is disposed, on the inner main surface 21 of the cover panel 2, at a position at which the piezoelectric vibration element 191 does not overlap the display panel 120 and the touch panel 130 in a plan view of the cover panel 2 viewed from the inner main surface 21 side. In other words, when the cover panel 2 is viewed from the inner main surface 21 side in the thickness direction of the cover panel 2, the piezoelectric vibration element 191 is disposed, on the inner main surface 21, at a position at which the piezoelectric vibration element 191 does not overlap the display panel 120 and the touch panel 130. Therefore, the touch panel 130 and the display panel 120 are not located between the cover panel 2 and the piezoelectric vibration element 191.

Further, the piezoelectric vibration element 191 is provided on an upper-side end portion 21a of the inner main surface 21 of the cover panel 2. More specifically, as shown in FIG. 10, the piezoelectric vibration element 191 is provided on a center portion 21 as in the horizontal direction (a lateral direction perpendicular to the longitudinal direction) at the upper-side end portion 21a of the inner main surface 21 of the cover panel 2.

Further, the piezoelectric vibration element 191 is disposed such that the longitudinal direction thereof coincides with the horizontal direction of the cover panel 2. Further, the piezoelectric vibration element 191 is disposed at the center portion 21aa of the upper-side end portion 21a such that the center in the longitudinal direction thereof coincides with the center in the horizontal direction at the upper-side end portion 21a of the inner main surface 21 of the cover panel 2.

As shown in FIGS. 7 and 8 described above, the piezoelectric vibration element 191 which produces flexural vibrations has the largest displacement amount at the center in the longitudinal direction thereof. Thus, the piezoelectric vibration element 191 is disposed at the upper-side end portion 21a such that the center in the longitudinal direction thereof coincides with the center in the horizontal direction at the upper-side end portion 21a of the inner main surface 21 of the cover panel 2. Consequently, the portion of the piezoelectric vibration element 191, at which a displacement amount of flexural vibrations is maximized, coincides with the center in the horizontal direction at the upper-side end portion 21a of the inner main surface 21 of the cover panel 2.

Additionally, in case where the touch panel 130 is located over the entire inner main surface 21 of the cover panel 2, the piezoelectric vibration element 191 may be disposed on the inner main surface 21 of the cover panel 2 with the touch panel 130 therebetween.

A clearance is provided between the touch panel 130 and the display panel 120 in the above-mentioned example as shown in FIG. 9. However, the touch panel 130 and the display panel 120 may be brought into contact with each other. A clearance, provided between the touch panel 130 and the display panel 120 as in the present embodiment, can prevent the cover panel 2 from hitting the display panel 120 (more accurately, the touch panel 130 from hitting the display panel 120) even if the cover panel 2 is pressed by the user with, for example, the finger and the cover panel 2 is bent toward the display panel 120. This prevents a display of the display panel 120 from being disturbed by the cover panel 2 hitting the display panel 120.

<Received Sound Produced by Receiver>

In the receiver 190 according to the present embodiment, the piezoelectric vibration element 191 vibrates the cover panel 2, so that air conducted sound and conduction sound are transmitted to the user from the cover panel 2. In other words, the vibrations of the piezoelectric vibration element 191 itself are transmitted to the cover panel 2, allowing for the transmission of air conducted sound and conduction sound to the user from the cover panel 2.

Herein, the air conducted sound is the sound recognized by the human brain when a sound wave (air vibrations), which has entered the external auditory meatus (so-called "earhole"), causes the eardrum to vibrate. Meanwhile, the conduction sound is the sound recognized by the human brain when the auricle is vibrated. The air conducted sound and conduction sound will now be described in detail.

Figure 11:
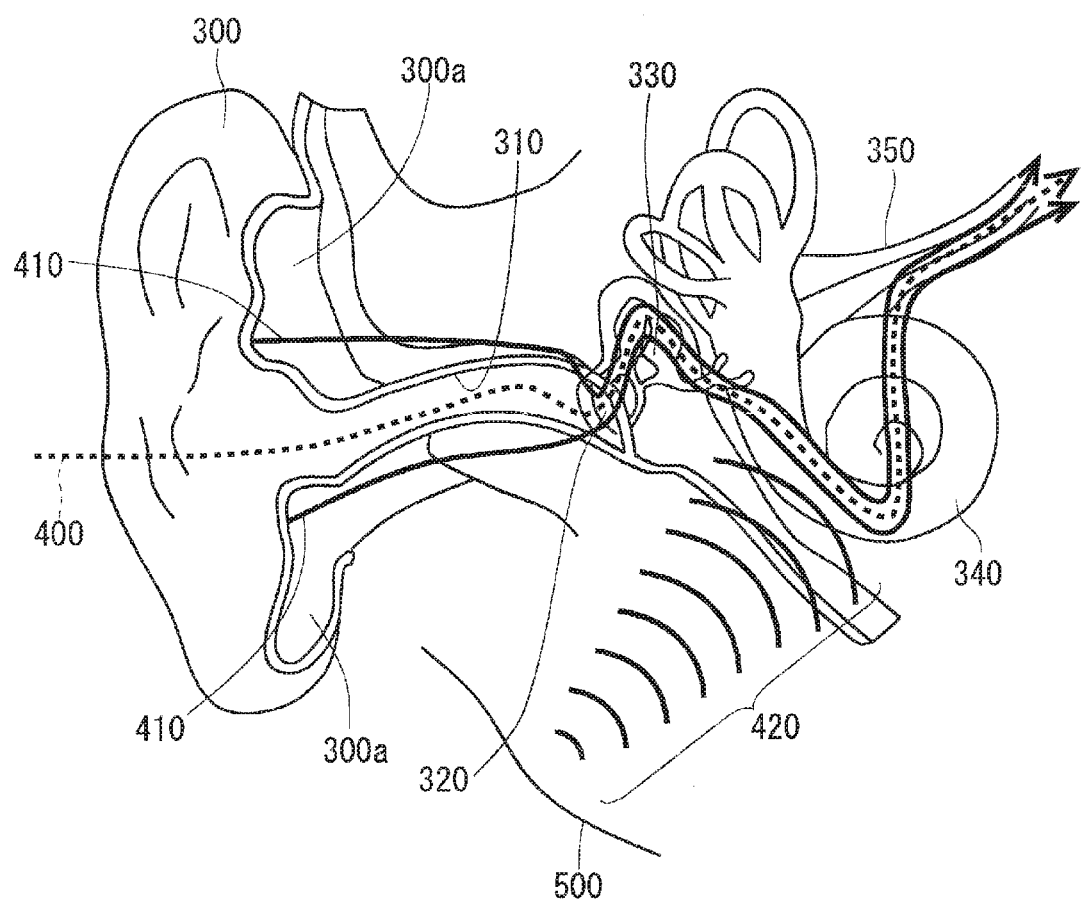
FIG. 11 illustrates a view for describing air conducted sound and conduction sound.

FIG. 11 is a view for describing the air conducted sound and conduction sound. FIG. 11 shows the structure of the ear of the user of the electronic apparatus 1. In FIG. 11, a dashed line 400 indicates a conductive path of a sound signal (sound information) when the air conducted sound is recognized by the brain. A solid line 410 indicates a conductive path of a sound signal when the conduction sound is recognized by the brain.

When the piezoelectric vibration element 191 mounted on the cover panel 2 is vibrated based on an electrical sound signal indicative of received sound, the cover panel 2 vibrates, whereby a sound wave is output from the cover panel 2. When the user has the electronic apparatus 1 in the hand and puts the cover panel 2 of the electronic apparatus 1 near an auricle 300 of the user or holds the cover panel 2 of the electronic apparatus 1 to (puts the cover panel 2 of the electronic apparatus 1 into contact with) the auricle 300 of the user, a sound wave output from the cover panel 2 enters an external auditory meatus 310. The sound wave from the cover panel 2 travels through the external auditory meatus 310 and causes an eardrum 320 to vibrate. The vibrations of the eardrum 320 are transmitted to an auditory ossicle 330, causing the auditory ossicle 330 to vibrate. Then, the vibrations of the auditory ossicle 330 are transmitted to a cochlea 340 and are then converted into an electrical signal in the cochlea 340. The electrical signal is transmitted to the brain through an auditory nerve 350, so that the brain recognizes the received sound. In this manner, the air conducted sound is transmitted from the cover panel 2 to the user.

Further, when the user has the electronic apparatus 1 in the hand and puts the cover panel 2 of the electronic apparatus 1 to the auricle 300 of the user, the auricle 300 is vibrated by the cover panel 2 vibrated by the piezoelectric vibration element 191. As indicated by the solid line 410, the vibrations of the auricle 300 are transmitted to the eardrum 320, causing the eardrum 320 to vibrate. The vibrations of the eardrum 320 are transmitted to an auditory ossicle 330, causing the auditory ossicle 330 to vibrate. Further, the vibrations of the auditory ossicle 330 are then transmitted to the cochlea 340 and are then converted into an electrical signal by the cochlea 340. Furthermore, in some cases, the vibrations of the auricle 300 are directly transmitted to the cochlea 340 without being transmitted to the eardrum 320 unlike the conductive path shown by the solid line 410. The vibrations are converted into an electrical signal in the cochlea 340. The electrical signal obtained by the cochlea 340 is transmitted to the brain through the auditory nerve 350, whereby the brain recognizes the received sound. In this manner, the conduction sound is transmitted from the cover panel 2 to the user. FIG. 11 also shows an auricular cartilage 300a inside the auricle 300.

In addition, the conduction sound described herein differs from bone-conducted sound (also referred to as "bone conduction sound"). The bone-conducted sound is the sound recognized by the human brain when the skull is vibrated and the vibrations of the skull directly stimulate the inner ear such as the cochlea. In FIG. 11, in case where, for example, a mandibular bone 500 is vibrated, a plurality of arcs 420 indicate a transmission path of a sound signal when the bone conduction sound is recognized by the brain.

As described above, in the electronic apparatus 1 according to the present embodiment, the piezoelectric vibration element 191 appropriately vibrates the cover panel 2 on the front surface. Consequently, the air conducted sound and conduction sound can be transmitted from the cover panel 2 to the user of the electronic apparatus 1. The structure of the piezoelectric vibration element 191 according to the present embodiment is contrived to appropriately transmit the air conducted sound and conduction sound to the user. Various advantages can be achieved by configuring the electronic apparatus 1 to transmit the air conducted sound and conduction sound to the user.

For example, the user can hear the sound by putting the cover panel 2 to the ear, and thus can have a telephone conversation without much consideration of the position of the electronic apparatus 1 to which the user puts the ear.

In addition, for large ambient noise, the user can make it difficult to hear the ambient noise by putting the ear strongly to the cover panel 2 while turning up the volume of the conduction sound. This enables the user to appropriately have a telephone conversation even if the ambient noise is large.

Further, even while wearing earplugs or earphones in the ears, the user can recognize the received sound from the electronic apparatus 1 by putting the cover panel 2 to the ear (more specifically, auricle). Alternatively, even while wearing headphones in the ears, the user can recognize the received sound from the electronic apparatus 1 by putting the cover panel 2 to the headphones.

As described above, in the receiver 190 according to the present embodiment, the piezoelectric vibration element 191 to be vibrated based on a sound signal vibrates the cover panel 2 and thereby transmits sound to the user. This eliminates the need for providing a receiver hole (earpiece hole) to the cover panel 2, unlike the case in which a dynamic speaker is used for the receiver 190.

<Processing of Making it Easier to Hear Sound from Electronic Apparatus>

Figure 12:
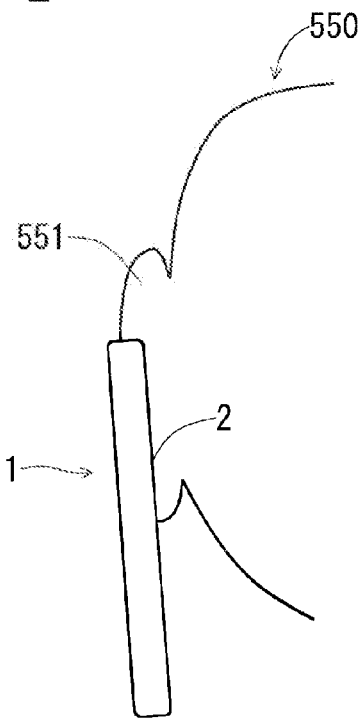
FIG. 12 illustrates a view showing how a user puts an ear to an upper end portion of the cover panel.
Figure 13:
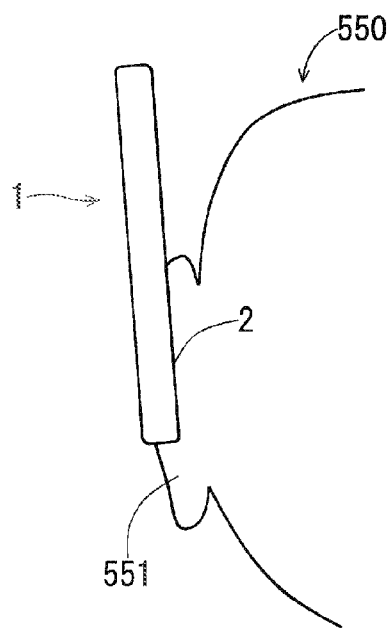
FIG. 13 illustrates a view showing how the user puts the ear to a lower end portion of the cover panel.

The electronic apparatus 1 according to the present embodiment transmits sound from the cover panel 2 to the user by vibrating the cover panel 2 using the piezoelectric vibration element 191. Consequently, how the user hears sound changes according to a position of the cover panel 2 to which the user puts the ear. When a user 550 puts an ear 551 to an upper end portion of the cover panel 2 as shown in, for example, FIG. 12 and puts the ear 551 to a lower end portion of the cover panel 2 as shown in FIG. 13, a volume and sound quality of sound transmitted from the cover panel 2 to the user 550 differ due to various factors such as how the user holds (the position of the hand) the electronic apparatus 1.

Further, due to a difference in the age, a preference and a shape of the ear of the user and how the user puts the ear to the cover panel 2, how sound is heard by the user differs in some cases even when the user puts the ear to the same place of the cover panel 2 and hears the same sound.

Thus, how sound is heard differs depending on a position of the cover panel 2 to which the user puts the ear and depending on users. Hence, for the user, there is an appropriate position of the cover panel 2 to which the user puts the ear, namely, an ear putting position of the cover panel 2 at which the user can easily hear sound. For example, when one user puts the ear to the upper end portion of the cover panel 2, the user can easily hear sound. However, when another user puts the ear to a center portion of the cover panel 2, the user can sometimes hear the sound easily. Hereinafter, a position of the cover panel 2 to which the user puts the ear will be referred to as an "ear putting position" in some cases.

In view of the above, when the controller 100 is performing processing of causing the piezoelectric vibration element 191 to vibrate based on a sound signal, namely, processing of outputting sound from the cover panel 2, if the ear putting position of the user is close to a reference position, the electronic apparatus 1 according to the present embodiment notifies that the ear putting position of the user is appropriate, to the user. Consequently, when the user is hearing sound by putting the ear to the cover panel 2, the user can learn whether a current ear putting position is appropriate, namely, whether or not the current ear putting position is at a position at which the user can easily hear sound. Consequently, when the current ear putting position is inappropriate, the user can change the ear putting position and bring the ear putting position close to an appropriate position. As a result, the user can easily hear sound from the electronic apparatus 1. This processing of the electronic apparatus 1 will be described in detail below. In addition, hereinafter, processing where the controller 100 causes the piezoelectric vibration element 191 to vibrate based on a sound signal will be also referred to as "receiver sound output processing" in some cases.

FIG. 14 is a block diagram mainly showing part of a configuration of the electronic apparatus 1. As shown in FIG. 14, the electronic apparatus 1 has an ear putting position specifying module 600, a determination module 610 and a notification module 620. The ear putting position specifying module 600 and the determination module 610 are functional blocks configured with, for example, the controller 100 executing the main program 103a in the storage module 103. In addition, the ear putting position specifying module 600 and the determination module 610 may be realized by hardware circuits instead of functional blocks, respectively.

When the electronic apparatus 1 is performing the receiver sound output processing, the ear putting position specifying module 600 specifies an ear putting position of the user based on a detection result of the touch panel 130. In other words, during execution of the receiver sound output processing, the ear putting position specifying module 600 specifies the ear putting position of the user with respect to the cover panel 2 based on an output signal from the touch panel 130. The touch panel 130 functions as a detector which detects the contact with the cover panel 2. A method of specifying an ear putting position in the ear putting position specifying module 600 will be described in detail below.

When the receiver sound output processing is being executed, the determination module 610 determines whether or not the ear putting position specified by the ear putting position specifying module 600 is close to a reference position 630. When a difference between the ear putting position specified by the ear putting position specifying module 600 and the reference position 630 is a predetermined value or less, the determination module 610 determines that the ear putting position is close to the reference position 630. Meanwhile, when the difference between the ear putting position specified by the ear putting position specifying module 600 and the reference position 630 is higher than the predetermined value, the determination module 610 determines that the ear putting position is not close to the reference position 630, namely, the ear putting position is remote from the reference position 630. A position of the cover panel 2 at which the user can easily hear sound is used as the reference position 630. The reference position 630 is stored in the storage module 103. The determination module 610 reads the reference position 630 from the storage module 103 to use. In addition, a method of determining the reference position 630 will be described in detail below.

When the receiver sound output processing is being executed, the notification module 620 notifies that the ear putting position of the user is appropriate, to the user based on the determination result of the determination module 610. More specifically, when the determination module 610 determines that the ear putting position of the user is close to the reference position 630, the notification module 620 notifies that the ear putting position of the user is appropriate, to the user.

In the present embodiment, for example, the piezoelectric vibration element 191 and the controller 100 which functions as the driving module which vibrates the piezoelectric vibration element 191 function as the notification module 620. The controller 100 causes the piezoelectric vibration element 191 to vibrate the cover panel 2 so as to notify that the ear putting position of the user is appropriate, to the user. In this regard, the cover panel 2 may be vibrated such that sound is transmitted from the cover panel 2 to the user. Alternatively, the cover panel 2 may only slightly vibrate, and the cover panel 2 may not transmit sound to the user. Further, when sound is transmitted from the cover panel 2 to the user, simple beep sound (buzzer sound) may be transmitted to the user, short sound such as "good" may be transmitted to the user or short music may be transmitted to the user.

Figure 15:
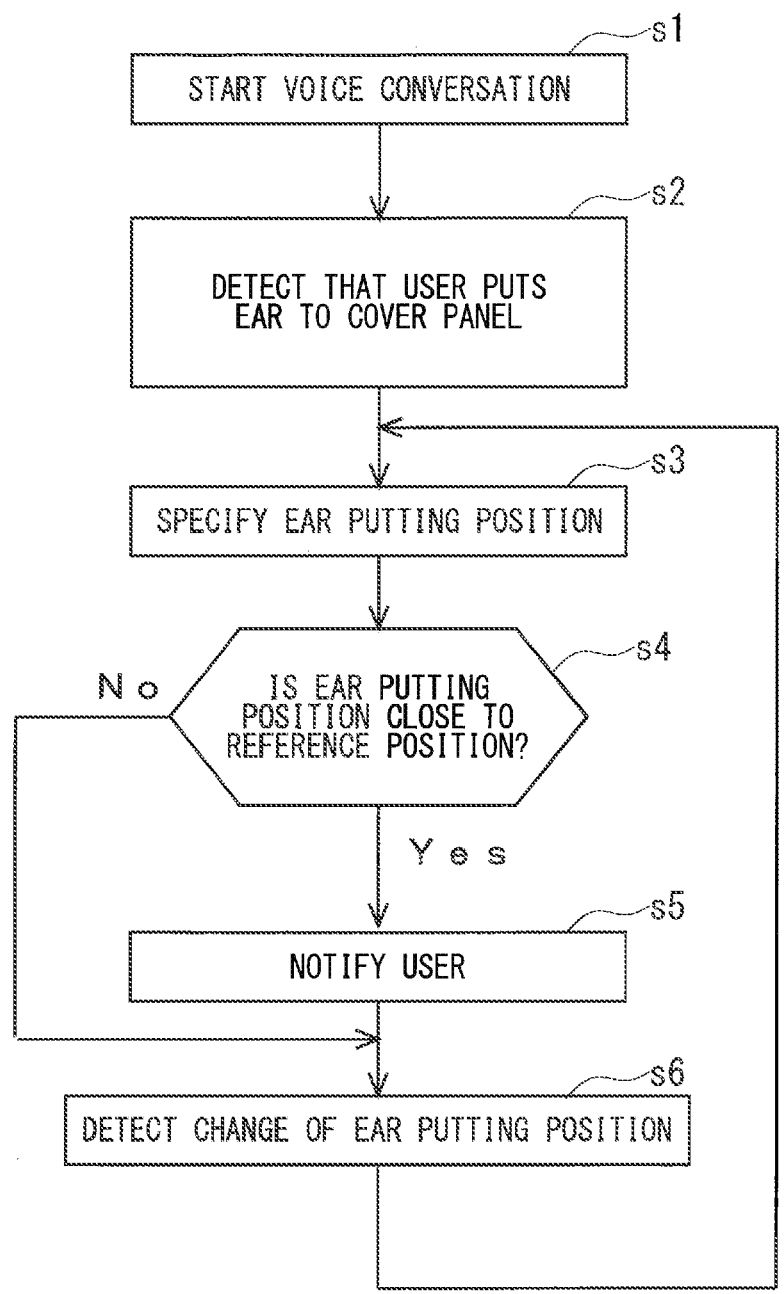
FIG. 15 illustrates a flowchart showing an operation of the electronic apparatus.

Next, a series of operations of the electronic apparatus 1 when whether or not an ear putting position of the user is close to the reference position 630 is determined and that the ear putting position of the user is appropriate is notified to the user based on the determination result will be described. FIG. 15 is a flowchart showing the operation. FIG. 15 illustrates an operation of the electronic apparatus 1 when the electronic apparatus 1 performs voice communication with a communication partner device. When the electronic apparatus 1 is performing voice communication, the electronic apparatus 1 performs the receiver sound output processing.

As shown in FIG. 15, in step s1, when the user manipulates a call button displayed on the display part 2a of the cover panel 2, the electronic apparatus 1 starts voice conversion with a communication partner device using the wireless communication module 110, the microphone 170 and the receiver 190. When the electronic apparatus 1 starts voice conversion, the user puts the ear to the cover panel 2 and tries to hear sound from the cover panel 2.

After step s1, in step s2, when the touch panel 130 detects that the user puts the ear to the cover panel 2, in step s3, the ear putting position specifying module 600 specifies the ear putting position of the user based on the detection result of the touch panel 130.

Next, in step s4, the determination module 610 determines whether or not the ear putting position of the user specified in step s3 is close to the reference position 630 in the storage module 103. In step s4, when it is determined that the ear putting position of the user is close to the reference position 630, in step s5, the notification module 620 notifies that the ear putting position of the user is appropriate, to the user by vibrating the cover panel 2. Consequently, the user can learn that a position of the cover panel 2 to which the user puts the ear is appropriate, namely, the position is at a position at which the user can easily hear sound.

Meanwhile, in step s4, when it is determined that the ear putting position of the user specified in step s3 is not close to the reference position 630, namely, when it is determined that the ear putting position of the user specified in step s3 is remote from the reference position 630, the notification module 620 notifies nothing to the user.

After step s4 or after step s5, in step s6, when the touch panel 130 detects that the ear putting position of the user changes, step s3 is executed again. That is, the ear putting position specifying module 600 specifies the changed ear putting position of the user based on the detection result of the touch panel 130. Subsequently, step s4 is executed and the determination module 610 determines whether or not the changed ear putting position of the user specified in step s3 is close to the reference position 630 in the storage module 103. Subsequently, the electronic apparatus 1 operates in the same way until voice communication is finished, in other words, until the receiver sound output processing is finished.

In addition, in step s3, the ear putting position specifying module 600 may specify an ear putting position within a predetermined period of time after the user puts the ear to the cover panel 2. More specifically, the ear putting position specifying module 600 specifies the ear putting position based on an output signal of the touch panel 130 within a predetermined period of time after the touch panel 130 detects a contact of an object, and does not perform this processing after the predetermined period of time passes. Hence, after the predetermined period of time passes during a telephone conversation, the output signal from the touch panel 130 is unnecessary. Consequently, it is possible to reduce power supply to the touch panel 130 after the predetermined period of time passes. Consequently, it is possible to reduce power consumption of the electronic apparatus 1.

As described above, the electronic apparatus 1 according to the present embodiment notifies that an ear putting position of the user is appropriate, to the user. Consequently, the user can learn whether the current ear putting position is appropriate while hearing sound from the cover panel 2. Consequently, when the current ear putting position is inappropriate, the user can change the ear putting position and bring the ear putting position close to an appropriate position. As a result, the user can easily hear the sound from the electronic apparatus 1.

In addition, the electronic apparatus 1 may notify the user that the ear putting position of the user is appropriate when the receiver sound output processing is being performed other than when voice communication is being performed. When, for example, the electronic apparatus 1 has a voice recorder function of recording sound input from the microphone 170 and playing back the sound, the controller 100 causes the piezoelectric vibration element 191 to vibrate based on a sound signal indicative of the recorded sound and plays back the recorded sound from the cover panel 2 in some cases. In this case, the user hears the recorded sound by putting the ear to the cover panel 2. Consequently, when the controller 100 is causing the piezoelectric vibration element 191 to vibrate based on the sound signal indicative of the recorded sound and playing back the recorded sound from the cover panel 2, if an ear putting position of the user is close to the reference position 630, the electronic apparatus 1 may notify the user that the ear putting position is appropriate.

Further, in the above example, the user is notified that the ear putting position is appropriate. However, the user may be notified that the ear putting position is inappropriate. In this case, in step s4, when it is determined that the ear putting position of the user is not close to the reference position 630, in step s5, the notification module 620 notifies that the ear putting position is inappropriate, to the user by vibrating the cover panel 2. In this regard, when sound is transmitted from the cover panel 2 to the user, simple beep sound (buzzer sound) may be transmitted to the user as described above, short music may be transmitted to the user or short sound such as "bad" may be transmitted to the user. Meanwhile, in step s4, when it is determined that the ear putting position is close to the reference position 630, the notification module 620 notifies the user nothing.

Thus, when the ear putting position of the user is not close to the reference position 630, the user is notified that the ear putting position of the user is inappropriate. Consequently, the user can learn whether or not the current ear putting position is appropriate. Consequently, when the current ear putting position is inappropriate, the user can change the ear putting position and bring the ear putting position close to an appropriate position. As a result, the user can easily hear sound from the electronic apparatus 1.

Further, the notification module 620 may notify the user that the ear putting position is appropriate, when the ear putting position of the user is close to the reference position 630, and notify the user that the ear putting position is inappropriate, when the ear putting position of the user is not close to the reference position 630. Consequently, the user can intuitively recognize that the ear putting position comes to an appropriate position upon changing the ear putting position to the appropriate position.

Further, in step s4, when it is determined that the ear putting position of the user is not close to the reference position 630 (when it is determined that the ear putting position of the user is remote from the reference position 630), the notification module 620 may notify the user of information for specifying the reference position 630. For example, the notification module 620 may notify the user of the information for specifying the reference position 630 by sound by vibrating the cover panel 2. In this case, in which direction the reference position 630 is positioned with respect to the current ear putting position is notified the user from the cover panel 2 by sound. More specifically, when the electronic apparatus 1 is viewed from the cover panel 2 side, for example, the reference position 630 positioned in an upper right direction with respect to the current ear putting position is notified the user by sound of "upper right". Further, the reference position 630 positioned in a lower left direction with respect to the current ear putting position is notified the user by sound of "lower left". Consequently, when the ear putting position is inappropriate, the user can easily change the ear putting position to an appropriate position.

In addition, when the user is notified of information for specifying the reference position 630, as a result, the user is notified that the ear putting position is inappropriate. That is, the notification module 620 can notify the user that the ear putting position is inappropriate by notifying the user of information for specifying the reference position 630. Consequently, when notifying the user that the ear putting position is inappropriate, the notification module 620 does not have to perform processing of notifying the user that the ear putting position is inappropriate (e.g. processing of transmitting sound of "bad" to the user) in addition to processing of notifying the user of information for specifying the reference position 630.

<Method of Specifying Ear Putting Position>

Next, an example of a method of specifying an ear putting position of the user in the ear putting position specifying module 600 will be described.

In this regard, in the electronic apparatus 1 according to the present embodiment, an XY coordinate system for specifying positions of a plurality of XY intersections of the touch panel 130 is defined. Further, the controller 100 can specify an X coordinate and a Y coordinate of each XY intersection in the XY coordinate system located under a portion of the display part 2a of the cover panel 2 which an object contacts, based on an output signal from the touch panel 130.

The ear putting position specifying module 600 according to the present embodiment specifies a portion of the display part 2a of the cover panel 2 which contacts the ear based on an output signal of the touch panel 130 when the ear of the user contacts the cover panel 2. Next, the ear putting position specifying module 600 specifies X coordinates and Y coordinates of a plurality of XY intersections on the touch panel 130 located under the specified contact portion. Next, the ear putting position specifying module 600 calculates an average value of a plurality of specified X coordinates, and calculates an average value of a plurality of specified Y coordinates. Further, the ear putting position specifying module 600 uses the position in the XY coordinate system specified by the calculated average value of the X coordinates and average value of the Y coordinates as the ear putting position of the user, namely, the ear putting position of the user with respect to the cover panel 2.

In addition, as long as the user can specify the position of the cover panel 2 to which the user puts the ear, the ear putting position may be specified by other methods.

<Method of Determining Reference Position>

The reference position 630 can be determined by various methods. Three types of a method of determining the reference position 630 will be described below. The reference position 630 is determined by the determination module 610 and is stored in the storage module 103.

<First Determining Method>

According to this first determining method, an average value of ear putting positions of the user specified in past by the ear putting position specifying module 600 is used as the reference position 630. For example, every time the controller 100 of the electronic apparatus 1 starts processing (such as voice communication) of causing the piezoelectric vibration element 191 to vibrate based on a sound signal, the determination module 610 calculates an average value of ear putting positions of the user specified by the ear putting position specifying module 600 in last several days. The storage module 103 stores ear putting positions of the user specified by the ear putting position specifying module 600 in last several days while the ear putting positions are updated. Further, the determination module 610 stores the calculated average value as the reference position 630 in the storage module 103. In this regard, when the old reference position 630 is stored in the storage module 103, the determination module 610 deletes the old reference position 630.

When the user puts the ear to the cover panel 2 to hear sound, the user puts the ear to a position of the cover panel 2 at which the user can easily hear sound as much as possible. Consequently, according to the first determining method, an average value of ear putting positions of the user specified in past by the ear putting position specifying module 600 is used as the reference position 630. Consequently, it is possible to use a position of the cover panel 2 at which the user can easily hear sound as the reference position 630.

<Second Determining Method>

According to this second determining method, a registration mode of registering the reference position 630 in the electronic apparatus 1 is provided in the electronic apparatus 1. Further, when the electronic apparatus 1 is operating in the registration mode, an ear putting position of the user specified by the ear putting position specifying module 600 is used as the reference position 630. The operation of the electronic apparatus 1 upon the registration mode will be described below.

FIG. 16 is a flowchart mainly showing the operation of the electronic apparatus 1 upon the registration mode. As shown in FIG. 16, in step s11, when the controller 100 specifies that the user performs a predetermined manipulation for instructing the electronic apparatus 1 to operate in the registration mode, on the display part 2a of the cover panel 2, based on an output signal from the touch panel 130, the electronic apparatus 1 starts operating in the registration mode in step s12.

When the electronic apparatus 1 starts operating in the registration mode, in step s13, the controller 100 causes the piezoelectric vibration element 191 to vibrate based on a sound signal, and causes the piezoelectric vibration element 191 to vibrate the cover panel 2.

Next, in step s14, the controller 100 controls the display panel 120 to display that the electronic apparatus 1 is operating in the registration mode on the display panel 120, and causes the display panel 120 to display instruction information 700 for instructing the user to put the ear to a position of the cover panel 2 at which the user's ear can easily hear sound. Consequently, on the display part 2a of the cover panel 2, that the electronic apparatus 1 is operating in the registration mode is displayed, and the instruction information 700 is displayed. FIG. 17 is a view showing a display example of the display part 2a in this case. In the example in FIG. 17, a character string that "Please put your ear to a position at which you can easily hear sound." is displayed as the instruction information 700.

Next, in step s15, when the controller 100 specifies that one of a plurality of manipulation buttons 141 included in the manipulation module 140 is manipulated, in step s16, the ear putting position specifying module 600 specifies the ear putting position of the user based on an output signal from the touch panel 130 at this point of time. Further, in step s17, the determination module 610 stores an ear putting position specified by the ear putting position specifying module 600 as the reference position 630 in the storage module 103. In this regard, when the old reference position 630 is stored in the storage module 103, the determination module 610 deletes the old reference position 630. Consequently, after step s14, when the user who has looked at the display of the display part 2a specifies a position of the cover panel 2 at which the user can easily hear sound while putting the ear to the cover panel 2 and manipulates one of a plurality of manipulation buttons 141 of the manipulation module 140, this ear putting position of the user is registered as the reference position 630 in the electronic apparatus 1. That is, a position of the cover panel 2 at which the user can easily hear sound is stored as the reference position 630 in the storage module 103. When step s17 is executed, the electronic apparatus 1 finishes operating in the registering operation mode in step s18.

Consequently, when the electronic apparatus 1 is operating in the registration mode, the user can use a position of the cover panel 2 at which the user can easily hear sound as the reference position 630 by setting the ear putting position specified by the ear putting position specifying module 600 as the reference position 630.

<Third Determining Method>

According to this third determining method, when the user notifies the electronic apparatus 1 that an ear putting position of the user is registered as the reference position 630 after the electronic apparatus 1 finishes the receiver sound output processing, the ear putting position of the user specified by the ear putting position specifying module 600 during execution of the receiver sound output processing is used as the reference position 630. The third determining method will be described in detail below using an example of voice communication accompanied by the receiver sound output processing.

Figure 19:
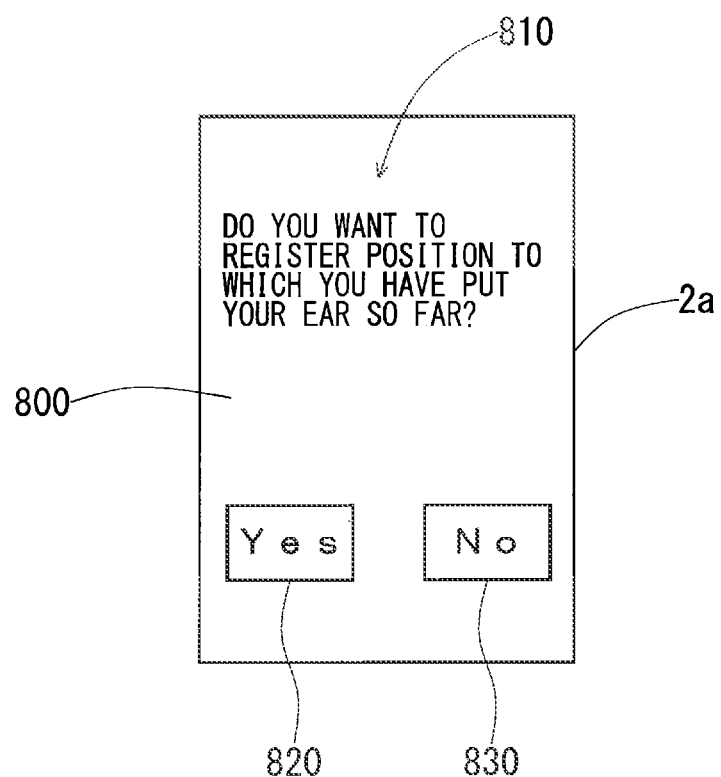
FIG. 19 illustrates a view showing a display example of the electronic apparatus.

FIG. 18 is a flowchart showing an operation of the electronic apparatus 1 when the reference position 630 is determined according to the third determining method. When the user manipulates an end call button displayed on the display part 2a, in step s21, the electronic apparatus 1 which is performing voice communication with a communication partner device finishes voice communication. In other words, the electronic apparatus 1 finishes the receiver sound output processing. Then, in step s22, the controller 100 controls the display panel 120 and causes the display panel 120 to display an input screen 800. Then, the input screen 800 is displayed on the display part 2a. This input screen 800 is used to notify the electronic apparatus 1 whether or not the user registers an ear putting position during voice communication (during execution of the receiver sound output processing) as the reference position 630. FIG. 19 is a view showing an example of the input screen 800 displayed on the display part 2a. In the example in FIG. 19, a character string 810 that "Do you want to register a position to which you have put your ear so far?", a Yes button 820 for notifying the electronic apparatus 1 that the ear putting position during voice communication is registered as the reference position 630, and a No button 830 for notifying the electronic apparatus 1 that the ear putting position during voice communication is not registered as the reference position 630 are displayed on the input screen 800.

Subsequently, in step s23, when the controller 100 specifies that the user who has looked at the input screen 800 displayed on the display part 2a has manipulated the Yes button 820 on the input screen 800, namely, the user notifies the electronic apparatus 1 that the ear putting position of the user during voice communication is registered as the reference position 630, in step s24, the determination module 610 stores the ear putting position specified by the ear putting position specifying module 600 during voice communication as the reference position 630 in the storage module 103. For example, the determination module 610 stores the ear putting position specified by the ear putting position specifying module 600 immediately before voice communication is finished, as the reference position 630 in the storage module 103. In this regard, when the old reference position 630 is stored in the storage module 103, the determination module 610 deletes the old reference position 630. Consequently, when the user who felt that the user could easily hear sound during voice communication manipulates the Yes button 820, the ear putting position of the user during voice communication is registered as the reference position 630 in the electronic apparatus 1. That is, the ear putting position at which the user felt that the user could easily hear sound during voice communication is stored as the reference position 630 in the storage module 103. Then, in step s25, the controller 100 controls the display panel 120 and deletes the display of the input screen 800 from the display part 2a.

Meanwhile, in step s23, when the controller 100 specifies that the user who has looked at the input screen 800 displayed on the display part 2a has manipulated the No button 830 on the input screen 800, namely, the user notifies the electronic apparatus 1 that the ear putting position of the user during voice communication is not registered as the reference position 630, step s25 is executed and the controller 100 controls the display panel 120 and deletes the display of the input screen 800 from the display part 2a.

As described above, when the user notifies the electronic apparatus 1 that an ear putting position of the user is registered as the reference position 630 after the electronic apparatus 1 finishes the receiver sound output processing, the ear putting position of the user specified by the ear putting position specifying module 600 during execution of the receiver sound output processing is used as the reference position 630. Consequently, it is possible to use a position of the cover panel 2 at which the user can easily hear sound as the reference position 630.

In the electronic apparatus 1 according to the present embodiment, the determination module 610 determines the reference position 630 using one of the above first to third determining methods.

MODIFICATIONS

First Modification

In the above example, the notification module 620 is configured with the piezoelectric vibration element 191 and the controller 100 which causes the piezoelectric vibration element 191 to vibrate. However, the configuration of the notification module 620 may be another configuration.

For example, the notification module 620 may be configured with the external speaker 180. In this case, at least one of that an ear putting position of the user is appropriate and that the ear putting position of the user is inappropriate is notified to the user. Further, sound is outputted from the external speaker 180 at a volume which does not make the user putting the ear to the cover panel 2 feel noisy.

Further, the notification module 620 may be configured of a vibration element which vibrates the cover panel 2 and is provided in addition to the piezoelectric vibration element 191 and the controller 100 which vibrates the vibration element. In this case, at least one of that an ear putting position of the user is appropriate and that the ear putting position of the user is inappropriate is notified to the user by vibration of the cover panel 2.

Further, a vibration element which vibrates the case part 3 of the apparatus case 4 and the controller 100 which causes the vibration element to vibrate may configure the notification module 620. In this case, at least one of that an ear putting position of the user is appropriate and that the ear putting position of the user is inappropriate is notified to the user by vibration of the case part 3.

Further, when a light emitter such as a light emitting diode is provided in the surface of the electronic apparatus 1 and the user can recognize light emitted from the light emitter in a state where the user puts the ear to the cover panel 2, the light emitter may configure the notification module 620. In this case, at least one of that an ear putting position of the user is appropriate and that the ear putting position of the user is inappropriate is notified the user by light emitted from the light emitter.

Second Modification

When the electronic apparatus 1 performs voice communication with a communication partner device, a position of the cover panel 2 at which the user of the electronic apparatus 1 can easily hear sound sometimes changes depending on features of voice (such as voice quality and the voice volume) of the user of the communication partner device, namely, the partner of voice communication. That is, the position of the cover panel 2 at which the user of the electronic apparatus 1 can easily hear sound sometimes changes depending on the partner of voice communication. Therefore, when the electronic apparatus 1 is performing voice communication with the communication partner device, in the case where the reference position 630 in the storage module 103 is at a position at which the user can easily hear sound and the electronic apparatus 1 is performing voice communication with another communication partner device, the reference position 630 in the storage module 103 is likely to be at a position at which the user has a little difficulty in hearing sound.

Hence, in the present example, a plurality of reference positions 630 different from one another are stored in the storage module 103. Further, the determination module 610 selects one reference position 630 of a plurality of reference positions 630 in the storage module 103 during voice communication, and determines whether or not an ear putting position specified by the ear putting position specifying module 600 is close to the selected reference position 630. Consequently, the electronic apparatus 1 can change the reference position 630 of use according to a communication partner device (a partner of voice communication) to have voice communication with. As a result, even when a communication partner device (a partner of voice communication) with which the electronic apparatus 1 performs voice communication changes, the user of the electronic apparatus 1 can perform voice communication with the partner while putting the ear to a position of the cover panel 2 at which the user can easily hear sound by taking into account a notification from the notification module 620.

A plurality of reference positions 630 in the storage module 103 are associated with a plurality of communication partner devices which are voice call destinations of the electronic apparatus 1, respectively. In the present example, a plurality of reference positions 630 in the storage module 103 are associated with all or part of a plurality of telephone numbers registered in an address book in the storage module 103, respectively, and thereby are associated with a plurality of communication partner devices respectively specified by a plurality of telephone numbers, respectively. When the communication partner device associated with the reference position 630 and the electronic apparatus 1 perform voice communication, each reference position 630 is at a position of the cover panel 2 at which the user of the electronic apparatus 1 can easily hear sound. When the electronic apparatus 1 is performing voice communication, the determination module 610 selects the reference position 630 associated with a communication partner device of the voice communication destination from a plurality of reference positions 630 in the storage module 103. Further, the determination module 610 determines whether or not the ear putting position specified by the ear putting position specifying module 600 is close to the selected reference position 630.

A plurality of reference positions 630 in the storage module 103 can be determined using, for example, the above third determining method. When, after the electronic apparatus 1 finishes voice communication with a communication partner device, the above input screen 800 is used and then that an ear putting position of the user is registered as the reference position 630 is notified the electronic apparatus 1, the ear putting position of the user specified by the ear putting position specifying module 600 during the voice communication is stored as the reference position 630 associated with the communication partner device in the storage module 103. In this regard, the ear putting position of the user is associated with a telephone number of the communication partner device and is stored in the storage module 103.

Further, when, after the electronic apparatus 1 finishes voice communication with another communication partner device, the above input screen 800 is used and then that an ear putting position of the user is registered as the reference position 630 is notified the electronic apparatus 1, the ear putting position of the user specified by the ear putting position specifying module 600 during the voice communication is stored as the reference position 630 associated with another communication partner device in the storage module 103. In this regard, the ear putting position of the user is associated with a telephone number of another communication partner device and is stored in the storage module 103.

In this way, a plurality of reference positions 630 corresponding to a plurality of communication partner devices which are voice communication destinations of the electronic apparatus 1 are stored in the storage module 103.

In addition, a position of the cover panel 2 at which the user can easily hear sound sometimes changes depending on a place at which the electronic apparatus 1 is positioned, namely, a place at which the user uses the electronic apparatus 1. When, for example, the user has a telephone conversation using the electronic apparatus 1 at a quiet place (e.g. a room of the user) and when the user has a telephone conversation using the electronic apparatus 1 at a noisy place (e.g. a station), ambient noise, how strongly the user puts the ear to the electronic apparatus 1 and how the user holds the electronic apparatus 1 (hand position) differ. Due to this factor and other various factors, a position of the cover panel 2 at which the user can easily hear sound changes depending on a place at which the electronic apparatus 1 is used. Consequently, a plurality of reference positions 630 associated with a plurality of places at which the user frequently uses the electronic apparatus 1 may be stored in the storage module 103. In this case, when the electronic apparatus 1 executes the receiver sound output processing, the determination module 610 selects the reference position 630 associated with a place at which the electronic apparatus 1 is currently positioned, from a plurality of reference positions 630 in the storage module 103. Further, the determination module 610 determines whether or not the ear putting position specified by the ear putting position specifying module 600 is close to the selected reference position 630. A place at which the electronic apparatus 1 is currently positioned can be specified based on position information output from a GPS (Global Positioning System) receiver by, for example, mounting the GPS receiver on the electronic apparatus 1.

A plurality of reference positions 630 associated with a plurality of places in the storage module 103 can be determined using, for example, the above third determining method. When, after the electronic apparatus 1 performing voice communication at a place finishes the voice communication, the above input screen 800 is used and then that an ear putting position of the user is registered as the reference position 630 is notified the electronic apparatus 1, the ear putting position of the user specified by the ear putting position specifying module 600 during the voice communication is stored as the reference position 630 associated with the place in the storage module 103. In this regard, the ear putting position of the user is associated with information for specifying the place and is stored in the storage module 103.

Further, when, after the electronic apparatus 1 performing voice communication at another place finishes the voice communication, the input screen 800 is used and then that an ear putting position of the user is registered as the reference position 630 is notified the electronic apparatus 1, the ear putting position of the user specified by the ear putting position specifying module 600 during the voice communication is stored as the reference position 630 associated with another place in the storage module 103. In this regard, the ear putting position of the user is associated with information for specifying another place and is stored in the storage module 103.

In this way, a plurality of reference positions 630 associated with a plurality of places are stored in the storage module 103.

Further, a position of the cover panel 2 at which the user can easily hear sound sometimes changes depending on a time zone in which the electronic apparatus 1 performs the receiver sound output processing. When, for example, the user has a telephone conversation using the electronic apparatus 1 at a quiet time zone (e.g. morning) and when the user has a telephone conversation using the electronic apparatus 1 at a noisy time zone (e.g. night), ambient noise, how strongly the user puts the ear to the electronic apparatus 1 and how the user holds the electronic apparatus 1 (hand position) differ. Due to this factor and other various factors, a position of the cover panel 2 at which the user can easily hear sound changes depending on a time zone in which the electronic apparatus 1 performs the receiver sound output processing. Consequently, a plurality of reference positions 630 associated with a plurality of time zones may be stored in the storage module 103. In this case, when the electronic apparatus 1 is performing the receiver sound output processing, the determination module 610 selects the reference position 630 associated with a time zone in which the receiver sound output processing is executed, from a plurality of reference positions 630 in the storage module 103. Further, the determination module 610 determines whether or not the ear putting position specified by the ear putting position specifying module 600 is close to the selected reference position 630. A time zone in which the electronic apparatus 1 performs the receiver sound output processing can be specified based on time information output from a GPS (Global Positioning System) receiver by, for example, mounting the GPS receiver on the electronic apparatus 1.

A plurality of reference positions 630 associated with a plurality of time zones in the storage module 103 can be determined using, for example, the above third determining method. When, after the electronic apparatus 1 performing voice communication in a zone finishes the voice communication, the input screen 800 is used and then that an ear putting position of the user is registered as the reference position 630 is notified the electronic apparatus 1, the ear putting position of the user specified by the ear putting position specifying module 600 during the voice communication is stored as the reference position 630 associated with the time zone in the storage module 103. In this regard, the ear putting position of the user is associated with information for specifying the time zone and is stored in the storage module 103.

Further, when, after the electronic apparatus 1 performing voice communication in another time zone finishes the voice communication, the input screen 800 is used and then that an ear putting position of the user is registered as the reference position 630 is notified to the electronic apparatus 1, the ear putting position of the user specified by the ear putting position specifying module 600 during the voice communication is stored as the reference position 630 associated with the another time zone in the storage module 103. In this regard, the ear putting position of the user is associated with information for specifying another time zone and is stored in the storage module 103.

In this way, a plurality of reference positions 630 associated with a plurality of time zones are stored in the storage module 103.

Further, a plurality of reference positions may be stored irrespectively of a communication partner device and a time zone, and the user may select one of a plurality of reference positions at random according to an ambient noise situation.

Other Modifications

The examples above have been of the case where the embodiments of the present disclosure are applied to a mobile phone. Alternatively, the embodiments of the present disclosure are also applicable to electronic apparatuses other than mobile phones.

The electronic apparatus 1 has been described in detail, but the above-mentioned description is illustrative in all aspects and the embodiments of the present disclosure are not intended to be limited thereto. The examples described above are applicable in combination as long as they do not contradict each other. Various modifications not exemplified are construed to be made without departing from the scope of the present disclosure.

The invention claimed is:
1. An electronic apparatus comprising:
    a cover panel that is provided in a surface of the electronic apparatus;
    a piezoelectric vibration module configured to vibrate the cover panel;
    a driving module configured to vibrate the piezoelectric vibration module based on a sound signal;
    a detector configured to detect a touch on the cover panel;
    an ear putting position specifying module configured to, when the driving module is performing processing of vibrating the piezoelectric vibration module based on the sound signal in the electronic apparatus, specify an ear putting position of a user with respect to the cover panel based on a detection result of the detector;
    a determination module configured to, when the processing is being performed, determine whether or not the ear putting position is close to a reference position, wherein the determination module uses an average value of the ear putting positions specified in past by the ear position specifying section as the reference position; and
    a notification module configured to, when the processing is being performed, notify the user at least one of that the ear putting position is appropriate and that the ear putting position is inappropriate, based on a determination result of the determination module.

2. The electronic apparatus according to claim 1, wherein when the determination module determines that the ear putting position is not close to the reference position, the notification module notifies the user of information for specifying the reference position while the processing is performed.

3. The electronic apparatus according to claim 1, wherein the notification module notifies the user at least one of that the ear putting position is appropriate and that the ear putting position is inappropriate by vibrating the cover panel.

4. The electronic apparatus according to claim 3, wherein the driving module and the piezoelectric vibration module function as the notification module.

5. The electronic apparatus according to claim 1, wherein the notification module notifies the user at least one of that the ear putting position is appropriate and that the ear putting position is inappropriate by transmitting sound to the user.

6. The electronic apparatus according to claim 1, wherein the electronic apparatus includes a registration mode of registering the reference position in the electronic apparatus, when the electronic apparatus is operating in the registration mode, the driving module vibrates the piezoelectric vibration module based on a sound signal, and when the electronic apparatus is operating in the registration mode, the determination module uses the ear putting position specified by the ear putting position specifying module as the reference position.

7. The electronic apparatus according to claim 1, wherein when the user notifies the electronic apparatus that the ear putting position is registered as the reference position after the processing is finished, the determination module uses the ear putting position specified by the ear putting position while the processing is executed, as the reference position.

8. The electronic apparatus according to claim 1, wherein when the processing is being performed, the determination module selects one reference position from a plurality of different reference positions, and determines whether or not the ear putting position specified by the ear putting position specifying module is close to the selected reference position.

9. The electronic apparatus according to claim 8, wherein the processing is executed when the electronic apparatus is performing voice communication with a communication partner device, the plurality of reference positions correspond to a plurality of communication partner devices that serve as voice communication destinations of the electronic apparatus, respectively, and when the electronic apparatus is performing voice communication, the determination module selects, from the plurality of different reference positions, a reference position corresponding to a communication partner device that is the voice communication destination, and determines whether or not the ear putting position specified by the ear putting position specifying module is close to the selected reference position.

10. The electronic apparatus according to claim 1, wherein the piezoelectric vibration module vibrates the cover panel such that air conducted sound and conduction sound are transmitted from the cover panel to the user.

11. A non-transitory storage medium readable by a computer that stores control program that controls an electronic apparatus that comprises a cover panel that is provided in a surface and a piezoelectric vibration module whose vibration vibrates the cover panel, the storage medium storing the control program configured to cause the electronic apparatus to execute the steps of:
(a) performing processing of vibrating the piezoelectric vibration module based on a sound signal;
(b) detecting a touch on the cover panel;
(c) specifying, when the processing is being performed, an ear putting position of a user with respect to the cover panel based on a detection result in the step (b);
(d) determining, when the processing is being performed, whether or not the ear putting position specified in the step (c) is close to a reference position, wherein the reference position is determined based on an average value of prior ear putting positions; and
(e) notifying, when the processing is being performed, the user at least one of that the ear putting position is appropriate and that the ear putting position is inappropriate, based on a determination result in the step (d).

12. An information notification method of an electronic apparatus that comprises a cover panel that is provided in a surface and a piezoelectric vibration module whose vibration vibrates the cover panel, the information notification method comprising the steps of:
(a) performing processing of vibrating the piezoelectric vibration module based on a sound signal;
(b) detecting a touch on the cover panel;
(c) specifying, when the processing is being performed, an ear putting position of a user with respect to the cover panel based on a detection result in the step (b);
(d) determining, when the processing is being performed, whether or not the ear putting position specified in the step (c) is close to a reference position, wherein the reference position is determined based on an average value of prior ear putting positions; and
(e) notifying, when the processing is being performed, the user at least one of that the ear putting position is appropriate and that the ear putting position is inappropriate, based on a determination result in the step (d).

* * * * *